US011522920B2

(12) United States Patent
Treat et al.

(10) Patent No.: US 11,522,920 B2
(45) Date of Patent: *Dec. 6, 2022

(54) PRIVACY-SECURE EDGE-ZONE COMPUTING FOR SECURE-OPERATION AUTHORIZATION

(71) Applicant: Accenture Global Solutions Limited, Dublin (IE)

(72) Inventors: David B. Treat, Ridgefield, CT (US); Tracy Ann Kuhrt, Apache Junction, AZ (US); Giuseppe Giordano, Antibes (FR); Chit Wah Christine Leong, Houston, TX (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/354,599

(22) Filed: Jun. 22, 2021

(65) Prior Publication Data

US 2021/0320951 A1     Oct. 14, 2021

Related U.S. Application Data

(63) Continuation of application No. 17/007,736, filed on Aug. 31, 2020, now Pat. No. 11,075,959.

(Continued)

(51) Int. Cl.
*G06F 15/173* (2006.01)
*H04L 9/40* (2022.01)
(Continued)

(52) U.S. Cl.
CPC ........ *H04L 63/308* (2013.01); *H04L 41/0893* (2013.01); *H04L 43/02* (2013.01); *H04L 43/50* (2013.01); *H04L 63/306* (2013.01)

(58) Field of Classification Search
None
See application file for complete search history.

(56) References Cited

U.S. PATENT DOCUMENTS

| 8,468,244 B2 | 6/2013 | Redlich et al. |
| 11,075,959 B2 | 7/2021 | Treat et al. |

(Continued)

FOREIGN PATENT DOCUMENTS

| AU | 2012223415 B2 | 5/2017 | |
| CA | 2718136 A1 * | 10/2008 | ........... G06F 15/161 |

(Continued)

OTHER PUBLICATIONS

Examination Report No. 2 for Australian Application No. 2020220201, dated May 19, 2021, 2 pages.

(Continued)

*Primary Examiner* — Phyllis A Book
(74) *Attorney, Agent, or Firm* — Crowell & Moring LLP (57) ABSTRACT

A system includes a security controller located within a central-zone in communication with a provisioned agent operating on an edge-zone device. The security controller may implement controller-blind security control on the edge-zone device by making security authorization determinations using a secure-operation confidence analysis performed by the provisioned agent. The provisioned agent, operating within the edge-zone, may have access to un-sanitized data, which may be unavailable to the security controller in the central-zone. The provisioned agent may access condition-descriptors via a secure-operation confidence assignment matrix. Using the condition-descriptors, the provisioned agent determine feedback, which may include a secure-operation confidence coefficient, based on the un-sanitized data to which the security controller is blind.

20 Claims, 4 Drawing Sheets

Related U.S. Application Data (60) Provisional application No. 62/910,079, filed on Oct. 3, 2019.

(51) Int. Cl.
  *H04L 41/0893* (2022.01)
  *H04L 43/02* (2022.01)
  *H04L 43/50* (2022.01)

(56) References Cited

U.S. PATENT DOCUMENTS

| | | | |
|---|---|---|---|
| 2004/0078490 A1* | 4/2004 | Anderson | H04L 61/35 709/219 |
| 2004/0111639 A1* | 6/2004 | Schwartz | H04L 63/105 726/1 |
| 2008/0168135 A1 | 7/2008 | Redlich et al. | |
| 2008/0222734 A1* | 9/2008 | Redlich | H04L 9/3271 726/26 |
| 2009/0254572 A1* | 10/2009 | Redlich | G06Q 10/107 |
| 2010/0250497 A1 | 9/2010 | Redlich et al. | |
| 2014/0007193 A1 | 1/2014 | Qureshi et al. | |
| 2014/0280952 A1* | 9/2014 | Shear | H04L 63/10 709/226 |
| 2014/0317315 A1* | 10/2014 | Duchesneau | H04L 41/04 709/250 |
| 2015/0379430 A1* | 12/2015 | Dirac | G06N 20/00 706/12 |
| 2016/0006754 A1 | 1/2016 | Woodward et al. | |
| 2016/0080403 A1 | 3/2016 | Cunningham et al. | |
| 2017/0039389 A1 | 2/2017 | Smith et al. | |
| 2018/0052636 A1 | 2/2018 | Frazier et al. | |
| 2018/0239959 A1* | 8/2018 | Bui | G06Q 10/103 |
| 2018/0276390 A1 | 9/2018 | Grafi | |
| 2019/0020658 A1 | 1/2019 | Racz et al. | |
| 2019/0042900 A1* | 2/2019 | Smith | G06V 20/00 |
| 2019/0220583 A1* | 7/2019 | Douglas | G06V 40/70 |
| 2019/0303562 A1* | 10/2019 | Masputra | H04L 69/164 |
| 2020/0159961 A1* | 5/2020 | Smith | H04L 67/12 |
| 2021/0103676 A1 | 4/2021 | Treat | |

FOREIGN PATENT DOCUMENTS

| | | | | |
|---|---|---|---|---|
| CN | 106663224 B | * | 2/2021 | G06N 20/00 |
| CN | 112384947 A | * | 2/2021 | G06N 3/063 |
| WO | WO 2012/118870 A1 | | 9/2012 | |
| WO | WO 2019/123167 A1 | | 6/2019 | |
| WO | WO 2019/123447 A1 | | 6/2019 | |

OTHER PUBLICATIONS

Examination Report No. 1 for Australian Application No. 2020230240, dated Mar. 24, 2021, 9 pages.
Examination Report No. 1 issued on Australian Application 2020220201, dated Dec. 22, 2020, 6 pages.
Extended European Search Report for European Application No. 20192308.3, dated Feb. 18, 2021, 9 pages.
Extended European Search Report of European Application No. 20193487.4, dated Dec. 23, 2020, 10 pages.

\* cited by examiner

PRIVACY-SECURE EDGE-ZONE COMPUTING FOR SECURE-OPERATION AUTHORIZATION

PRIORITY

This application claims priority to U.S. patent application Ser. No. 17/007,736, filed 31 Aug. 2020, entitled Privacy-Secure Edge-Zone Computing for Secure-operation Authorization, which is incorporated herein in its entirety. U.S. patent application Ser. No. 17/007,736 claims priority to U.S. Provisional Patent Application No. 62/910,079, filed 3 Oct. 2019, entitled Digital Identity Edge Computing, which is incorporated herein in its entirety.

TECHNICAL FIELD

This disclosure relates to edge-zone computing.

BACKGROUND

Rapid advances in electronics and communication technologies, driven by immense customer demand, have resulted in the widespread adoption of electronic transactions, record keeping, and data sharing. As one example, electronically stored and tracked identity information has provided the underpinning for Big Data technologies and enterprises. Improvements in tracking and/or knowledge management attached to such electronically stored and tracked identity information will continue to increase the features and options available to operators engaging in data operations.

DETAILED DESCRIPTION

In an electrical and computer system, a central control system allowed operations for a target device. In some cases, the authorization decisions may be based on feedback data sent from the target device back the central control system allowing the central system to allow/deny secure-operations based on information (e.g., compliance information in view of condition-descriptors) collected at the target device, for example, local sensor data, and not necessarily locally-available (or easily available) to the central control system.

In some cases, data on which the secure controller may base a secure-operation allowance/denial decision based on sensitive data (e.g., un-sanitized data, as discussed below). Accordingly, transferring the sensitive data to the secure controller may constitute a violation of privacy and/or security standards. Additionally or alternatively, transfer of sensitive to the secure controller in an unencrypted or easily decrypted form may cause onerous data protection requirements to go into force. Accordingly, a system may allow for central-zone collection of information in a manner that allows for long-term storage of sensitive data, but not provide of practicable use of that same data. The central-zone collection may be supplemented by edge-zone computing. Thus, use and/or analysis of sensitive data may occur in the edge-zone even if collection still occurs in the central-zone.

As an illustrative scenario, a first set of guidelines may compel collection of sensitive data. For example, Anti-Money Laundering/Know Your Customer laws may compel institutions to collect and/or make decisions based on sensitive data. At the same time, data handling laws such as the General Data Protection Regulation may onerous standards for holding such data. Accordingly, the technical problem of having easily accessible data to perform the compelled analysis that has with impenetrable security to comply with privacy laws is created. The techniques and architectures discussed herein (including edge-zone enforcement, provisioned agents, sanitized uplink establishment, and/or security controlled circuitry) provide a technical solution this technical problem by transferring sensitive data analysis / review to the edge-zone. Thus, in some cases, central-zone computing is obviated at least in part. Thus, central-zone collection of sensitive data is unnecessary (in part or in whole) to support computing in some implementations. Accordingly, where central-zone data collection is compelled, this technical solution allows the central-zone collection to be done in a manner in which use of such data is impracticable or nearly impossible. Thus, the central-zone data may be held in an extremely secure form. For example, data may be encrypted with keys that are held in an entirely different (potentially air-gapped) location with security protocols independent of those of the data store. Accordingly, an attacker would be forced to go through multiple independent security schemes to compromise the data. In some cases, where such collection is not necessarily compelled, central-zone collection of sensitive data may be forgone altogether.

In various implementations, securing data within a defined edge-zone allows for access to data (which may include sensitive private data) from which to base secure-operation allowance/denial decisions. In various systems, similar data may be obtained using query and/or surveillance tools (which may be computationally intensive, in some cases) from data available outside the edge-zone. In other words, in some cases, the data used in the pixel-state calculations may, in some cases, be computationally predicted or derived rather than obtained from the user from which it originates. However, such analytic derivation may have comparatively less accurate and efficient than a direct poll of the source of the data. Accordingly, establishment and enforcement of the edge-zone may increase the accuracy and efficiency of the underlying hardware performing the open-loop pixel-state control.

In various implementations, data sharing control may be implemented by applying homomorphic encryption (e.g., a cryptologic technique) to un-sanitized data. The homomorphic encryption may allow sharing of selected data, data details, metadata, and/or other data features without necessarily sharing un-sanitized data from which such selected data features may be derived or later recreated. The un-sanitized data may refer to data in a decrypted/unencrypted form on which secure-operation authorization determinations may be made. For example, un-sanitized data may include empirical data, test data, survey data, collected data, historical utilization data, account transaction data (e.g., from other applications running on the device) sales data environmental data, industrial data, fabrication specifications, identity data, credit-worthiness data, educational credential data, government record data, data regarding attempts to redirect transaction sources or targets (e.g., in parallel transactions) or other data on which analyses may be performed.

Homomorphic encryption schemes may include a class of multiple different encryption schemes. Homomorphic encryption schemes use a homomorphic property of certain encryption algorithms, e.g., $H_m(x)$, where $H_m$ designates a homomorphic encryption algorithm. The homomorphic property provides that the sum of encrypted values is equal to the value of the encrypted sum of the values, e.g., $H_m(x)+H_m(y)=H_m(x+y)$. This homomorphic property may be used to disclose various features of the underlying data values, e.g., x and y, without disclosing x and y, using various known mathematical results from the homomorphic property. Further, because addition (e.g., an ADD operation) and multiplication (e.g., a MULT operation) may be performed on the encrypted data without decryption, processing operations, such as mathematical or modeling operations, may be performed on the data while in an encrypted state. Similarly, subtraction operations may be performed (e.g., inverse additions because: $H_m(x+y)+H_m(y)=H_m(x)$). Accordingly, insights may be gleaned from aggregated data and/or sanitized data (e.g., privacy-preserving selected information) regarding without disclosing the un-sanitized data.

In some cases, homomorphic encryption and/or other encryption schemes may be implemented to enforce logical zones, as discussed below. In some cases, the logical zones may be implemented as secure enclaves that are local to a device (such as an edge-zone device, discussed below). The secure enclaves may offer controlled access to data for secure-operations authorization determinations. In some cases, logical zones may not necessarily be implemented using secure enclaves. For example, in some implementations, any memory on the edge-zone device (and/or memory within a portfolio container (discussed below)) may be within the logical edge-zone. Accordingly, an implementation may use all, any, or any combination of secure enclaves, physical zones, and/or logical zones to regulate acceptable memory locations for particular data and/or agent execution.

A secure-operation (SO) may include a computer-based or network-based operation for which defined security standards may be set. The defined security standards may include hardware and/or software guidelines for the edge-zone device. The defined security standards may also include activity guidelines. In some cases, defined security standards may include enterprise policies (e.g., security policy such as those for remote email account access, policies for financial transactions, regulatory framework compliance policies, or other policies). For example, activity that may allow for obfuscation of transaction sources may be disallowed. In an illustrative example, a first application may request a parallel transaction that moves credits from a first account into a second account. A second application may attempt to obtain a secure-operation to move the credits from the second account to third account without properly divulging that the credits originated from the first account and/or the existence of the first application on the edge-zone device. In another illustrative example, multiple parallel transactions may be used to obfuscate the overall size of the effective transaction that occurs. For example, what appears to be a number of small credit transfers from many accounts into one account may actually be a single one-to-one account-to-account transfer that is mediated by many smaller intermediate account transfers. In various implementations, a parallel transaction may be a transaction used to obfuscate the source and/or target of a transaction being handled through a secure-operation. In other words, the architectures and techniques described herein may be used to monitor activity on the edge-zone device that may be ostensibly unrelated to the SO, but in relativity may be used to skirt security standards set for the SO.

In some cases, the controlled access to the secure enclave may include access to homomorphically-encrypted data to allow manipulation and calculation without necessarily exposing private data. For example, a secure enclave may provide access to a homomorphically-encrypted version of private data, but not the underlying private data. An agent (discussed below) may execute calculation/manipulation on the homomorphically-encrypted data while encrypted. Secure local logic on the device may cause the enclave to expose an unencrypted form of the result (or execute/request a corresponding action without necessarily exposing the result) after manipulation. Thus, the underlying data remains protected within the secure enclave (and local to the device) without exposure to agent logic (including some cases where the agent itself is localized).

Additionally or alternatively, the controlled access to the secure enclave may include access to data with types of encryption that may not necessarily allow operations on the data while in an encrypted form. Accordingly, some enclaves may not necessarily be implemented using homomorphic encryption schemes. The enclaves may be the logical zones (which are also physically localized to specific locations on the mobile device) in which private data may be decrypted. Outside the enclave, only encrypted forms of the data may be allowed. The enclaves may be data specific, application specific, or specific to neither. For example, a particular enclave may house specified private data (photos, contacts, demographic data, financial data, and/or other private data) and mediate access to that data for applications (in some cases all applications) accessing the specified data. In some cases, enclaves may house various unspecified private data for interaction with a specific application or applications. In some cases, the enclave may mediate interactions among unspecified private data and unspecified applications.

To maintain data privacy and security, an edge-zone may be defined for an open-loop pixel-state control system. The edge-zone may be protected such that data traveling out of the edge-zone (e.g., on uplinks to the display control prime) is sanitized. The edge-zone may be logically- and/or physically-localized.

Logical localization may be defined by a logical perimeter (e.g., various physical storage and process locations that enforce the encryption requirements of the logically-localized edge-zone) which may not necessarily be physically localized. In other words, storage and processing locations within a logically-localized edge-zone may be physically distributed (in some cases, co-located (at least in part) with the security controller hardware) but logically maintain the edge-zone through encryption parameters. For example, homomorphic encryption may be used to define an example logically-localized edge-zone (e.g., data within the edge-zone must be homomorphically encrypted), but the hardware hosting processing and storage locations with example edge-zone may be physically distributed.

Physical localization may be defined by one or more physical perimeters. For example, specific hardware devices may be wholly (or partially) within the edge-zone. Thus, processing or storage on those devices would be in the edge-zone. Therefore, processing physically done on the device would be within the edge-zone, but off-device processing may be outside the edge-zone even where encryption usage or hardware configurations the same or similar to that of the edge-zone are used.

In some cases, an edge-zone may use physical and logical localization. For example, a physical perimeter and a logical perimeter may be defined for an edge-zone. Storage and/or processing may be in the edge-zone if it occurs within at least one of the perimeters. In some cases, both physical and logical localization may be used in tandem. Accordingly, storage and/or processing may be in the edge-zone if it occurs within both of the perimeters.

An edge-zone device may include a device (or a portion of a device) hosting storage and/or processing within an edge-zone. An edge-zone device may execute one or more applications that may direct or request participation in a SO.

A central-zone may include one or more regions outside the edge-zone including hardware implementing the security controller.

Figure 1:
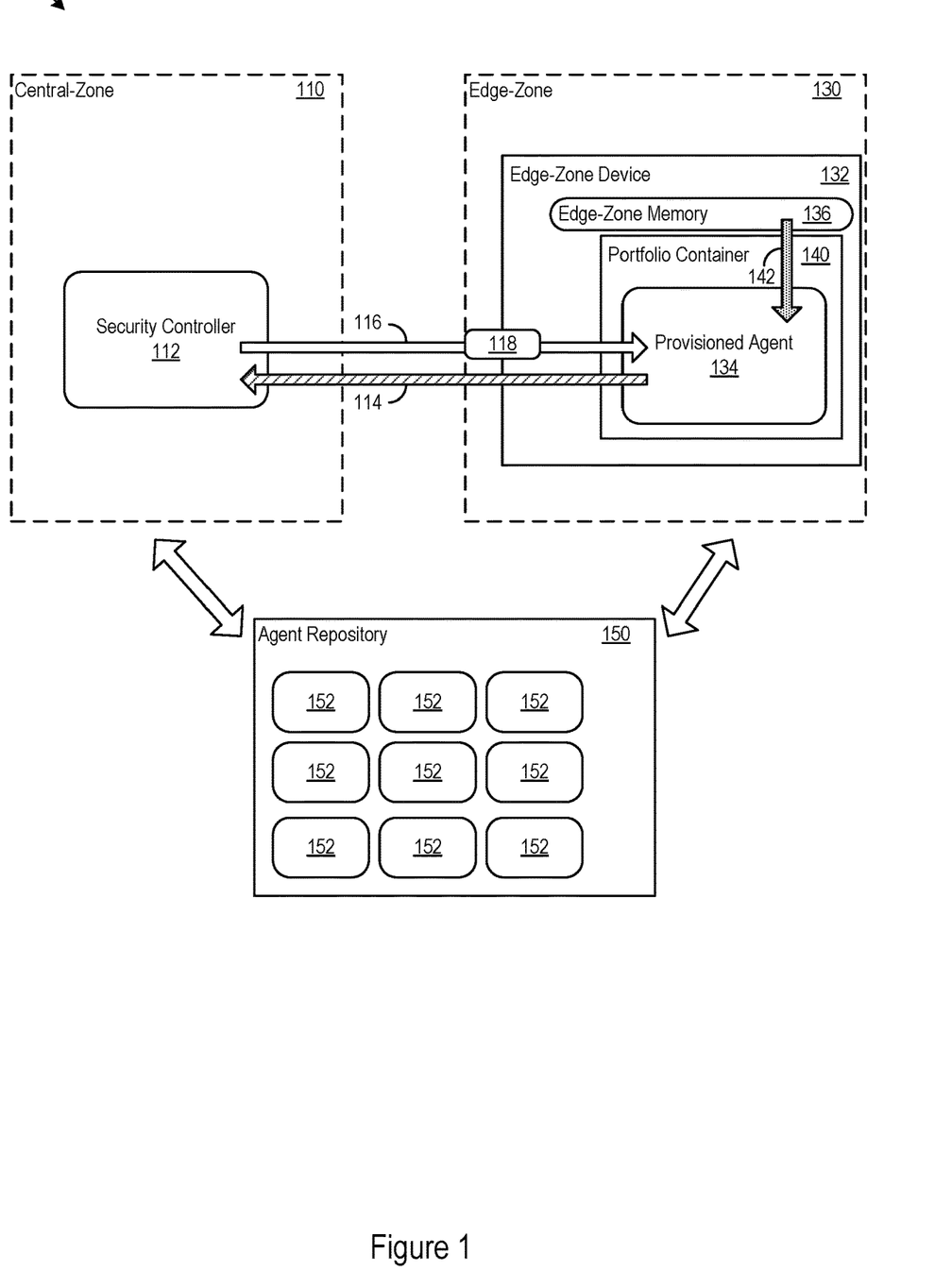
FIG. 1 shows an example secure-operation control environment.

FIG. 1 shows an example SO control environment 100. In the example SO control environment 100, a security controller 112 within a central-zone 110 has established a sanitized uplink 114 with an edge-zone provisioned agent 134 on an edge-zone device 132 in a privacy-secure edge-zone 130. In this illustrative example, the security controller 112 has also established an edge-support downlink 116. The security controller 112 has provided the provisioned agent with a confidence assignment matrix 118. The provisioned agent is further located within a portfolio container 140 on the edge-zone device 132. The portfolio container 140 may include a quarantined space for one or more agents (potentially controlled by multiple different security controller systems). The portfolio container 140 may include an un-sanitized data import channel 142 for moving un-sanitized data from edge-zone memory 136 into the portfolio container and on to the agent(s) therein.

In some cases, prior to provisioning, pre-provisioned agents may be maintained in agent repository 150. The agent repository 150 may include multiple different pre-provisioned agents 152 corresponding to different security controller systems (e.g., and different enterprises). Accordingly, the agent repository may be maintained by a third party controlling neither the edge-zone device 132 nor the security controller 112. In some cases, the agent repository may include a search function and/or a virtual "app store" type storefront where users may find and install agents for their edge-zone devices. In some cases, the agents may be pre-provisioned with the repository with the confidence assignment matrix 118.

Figure 2:
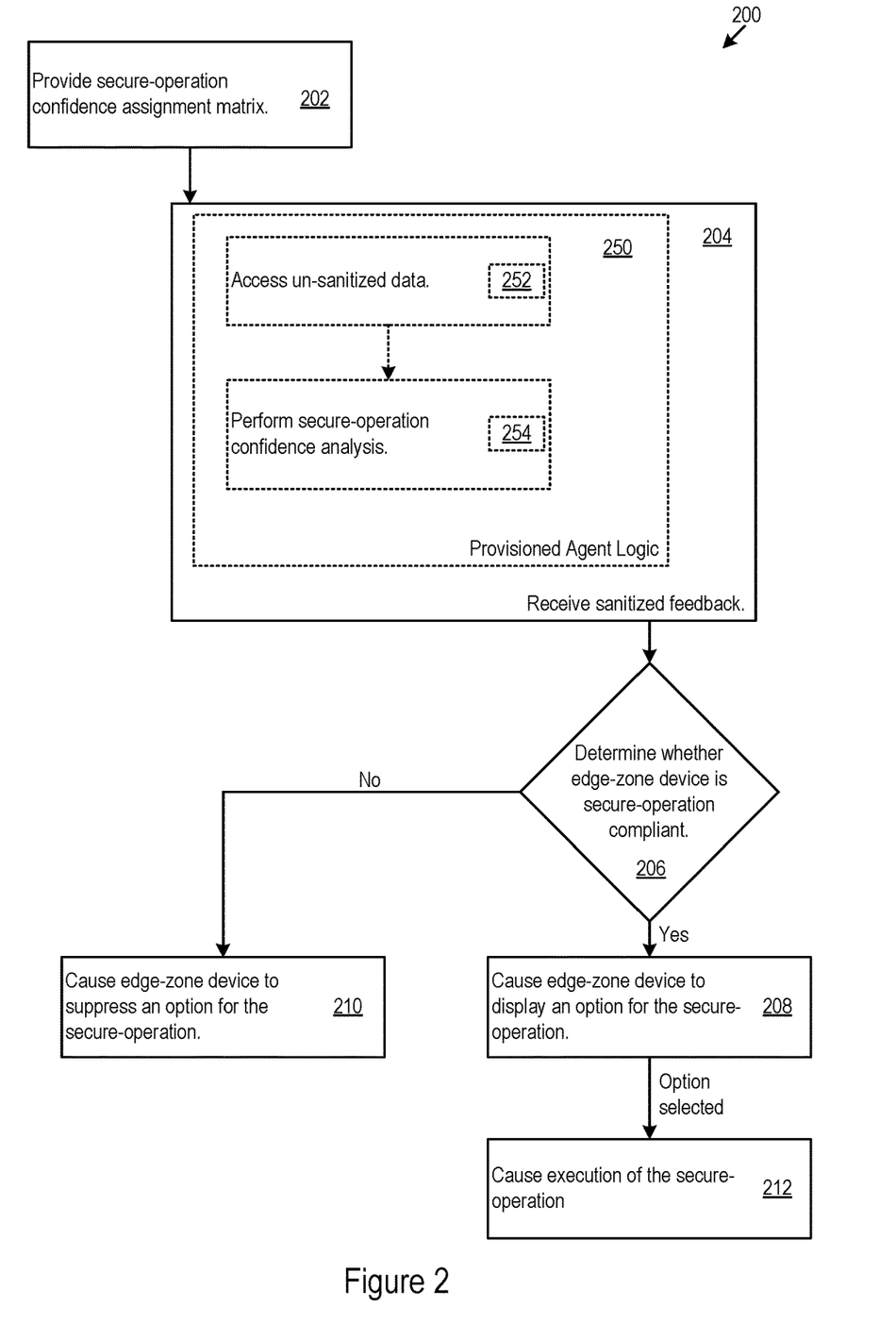
FIG. 2 shows example security control logic.

Referring now to FIG. 2 while continuing to refer to FIG. 1, FIG. 2 shows example security control logic (SCL) 200 which may define the operation of hardware executing as security control circuitry.

The SCL 200 may provide a SO confidence assignment matrix 118 to the provisioned agent 134 (202). The confidence assignment matrix 118 may include a data structure (such as a table, self-executing code, algorithms, machine-learning code, or other data structure) that may accept input data (e.g., un-sanitized data available within the privacy secure edge-zone) to determine compliance with one or more conditions-descriptors and based on that compliance assign a confidence coefficient. The conditions-descriptors may include definitions of conditions that may increase or decrease confidence in the security of the edge-zone device. The agent may determine whether the defined conditions are present to determine a confidence score using data available within the edge-zone. The agent may report the confidence coefficient (in some cases, without explanation). For example, the security controller may send the condition-descriptors as a group in the confidence assignment matrix 118, but the security controller may be blind to the un-sanitized data on which determination rests. In some cases, the agent may report whether individual conditions are present (or not present) but may forgo further explanation. For example, condition specific reporting may be used where a confidence score is not used or where such a score is used in part to make a security authorization determination. For example in some implementations, some conditions may be required regardless of the number of or score associated with other conditions that may be present.

In some implementations, condition-descriptors may include asserted private data that may be held by the central-zone. For example, asserted private data may include data that a user previously provided to the security controller (or an associated entity), e.g., to gain access to secure-operations (SOs). The asserted private data may be packaged in the condition-descriptors for comparison with captured un-sanitized data (e.g., captured data) available in the edge-zone. The comparison may yield insight as to whether the user was truthful and/or complete in the initial provision of the asserted data. In an illustrative scenario, consistence (e.g., a match) between the captured and asserted data may increase an assigned SO confidence coefficient while inconsistence (e.g., a mismatch) may reduce an assigned SO confidence coefficient (e.g., for schemes where a higher SO confidence coefficient indicates more compliance). In some cases, the asserted private data may be hashed before being provided in the condition-descriptors. The captured data may similarly be hashed after capture. The asserted and captured data may be compared in hashed form. In some cases, hashing the asserted private data before inclusion in the condition-descriptor may protect the asserted data from compromise while being passed (e.g., from the SCL 200 to the provisioned agent logic (PAL) 250).

In some cases, context for the captured data may also be analyzed. In some cases, the context of the captured data may indicate whether the captured data is reliable. For example, a user may be less likely to provide inaccurate data to a bank or other financial institution. Accordingly, captured data from a third-party bank may be a comparatively high reliability context. In some cases, a user might be quite likely to provide inaccurate information to a free online vendor looking to collect personal data for marketing. Accordingly, information given to a third-party online marketing vendor might be a comparatively low reliability context. Accordingly, a mismatch between the asserted private data and captured data from a reliable context (e.g., a comparatively high reliability context) may be more likely to indicate a security issue than a mismatch from an unreliable context (e.g., a comparatively low reliability context). Accordingly, the SO confidence assignment matrix may be configured to compel an increased penalty for a mismatch associated with a reliable context relative to the penalty (or absence thereof) associated with an unreliable context.

In some implementations, the agent may report an explanation of the determinations based on the conditions descriptors. However, the explanation may be encrypted or otherwise obfuscated such that it may be intended not to be used or reviewed by the security controller. Rather, the explanation data may be held for possible (but, in some cases, unlikely) future audits (e.g., internal audits, audits for compliance with know your customer or anti-money laundering laws, external investigations, certifications that the information was collected, or other audits). Thus, where the security controller (or the associated enterprise) is compelled to record the data used in its security determinations for secure-operations authorizations, the security controller may obtain that data in a form that may be robust to comprise. Thus, the security liability associated with possession of such data may be reduced compared to data obtained in more readily useable forms.

The SCL 200 may receive sanitized feedback from the provisioned agent 134 over the sanitized uplink (204). The reception of this feedback may be dependent on the execution of PAL 250 by the agent. Accordingly, the execution of the PAL 250 by the agent may not necessarily be affirmatively performed by (or under the direct control of) the SCL 200 (or any entity controlling the SCL 200). Rather the execution of the PAL 250 performed by the provisioned agent describes the specific conditions under which sanitized feedback may be received by the SCL 200 over the sanitized uplink. The feedback may include the SO confidence coefficient and/or explanation data regarding the condition-descriptors.

Referring now to the PAL 250 of FIG. 2, prior to sending the sanitized feedback to the SCL 200, the PAL 250 may access un-sanitized data while the provisioned agent 134 is localized in the privacy-secure edge-zone (252). In some cases, the provisioned agent may be located within a portfolio container 140. To access the un-sanitized data from within the portfolio container 140, the provisioned agent 134 may request import of the un-sanitized data over the import channel 142.

The portfolio container 140 may enforce import rules. For example, specific agents within the portfolio container may have specifically-defined access to specific types of un-sanitized data. For example, in some implementations, the portfolio container may cause imported data to be homomorphically encrypted before import to facilitate performance of the SO confidence analysis of the data in a homomorphically encrypted state. The portfolio container 140 (e.g., via the import channel 142) may inspect data incoming into the portfolio container (e.g., to ensure the import rules are followed). For example, an agent reviewing parallel transactions may have access to data regarding events within a specific timeframe (e.g., same minute, hour, day, week as the reviewed transaction (or other period)), but be barred from requesting information outside the window.

In some cases, provisioned agents may comply with a pre-access condition to access un-sanitized data. For example, the import channel 142 may constrain access to a particular type of un-sanitized data to agents that have implemented a pre-determined level of encryption protection. In an example, the import channel 142 may enforce a sanitization criterion on data bound for the sanitized uplink. In the example, the import channel may force the agent to comply with a new or stricter sanitization scheme (e.g. further constraining the type of data that may be sent to the security controller) before agreeing to send additional un-sanitized data.

The provisioned agent 134 may perform a SO confidence analysis to determine the SO confidence coefficient and/or other feedback (254). The SO confidence analysis may be based on the condition-descriptors in the SO confidence assignment matrix and un-sanitized data available within the edge-zone. The provisioned agent may scan data and activity on the edge-zone device to determine existence/non-existence of the conditions defined in the conditions-descriptors. Based on the confidence analysis, the provisioned agent 134 may assign the SO confidence coefficient, for example, in accord with a scoring scheme defined in the SO confidence assignment matrix. The feedback provided by the provisioned agent may be sanitized (e.g., by data removal/anonymization and/or encryption in accord with sanitization schemes).

In some implementations, the SO confidence analysis may be performed while the data is in a homomorphically encrypted state. For example, the un-sanitized data may be translated in to mathematical representations of the underlying data. For example, particular data and/or conditions may be translated into a scoring or number assignment. The mathematical representations may then be homomorphically encrypted. The SO confidence analysis may then be performed on the homomorphically-encrypted data. The result of the SO confidence analysis may be decrypted (using the same key used to encrypt the input data) to reveal the SO confidence coefficient.

After receiving the sanitized feedback, the SCL 200 may determine whether the edge-zone device is SO compliant (206). SO compliance may be individual SO specific. For example, standards for SO compliance for a first SO may be different from SO compliance with a second SO. For example, an edge-zone device may be SO compliant for credit transfer request among existing accounts, but SO non-compliant for new account creation (or vice versa).

In some implementations, SO compliance may be determined based on the SO-confidence coefficient. For example, an edge-zone device with a SO-confidence coefficient above (or below, depending on the scheme) defined threshold may be SO compliant, while an edge-zone device not meeting the threshold may be SO non-compliant. In some cases, the SO-confidence coefficient determination may use a scheme that compels specific conditions being met to achieve SO-compliance. For example, in a scoring-type scheme points attributed to certain conditions may be large enough to guarantee failure if not met. In some cases, certain conditions may guarantee success. In some cases, certain conditions may guarantee neither success nor failure but contribute to either.

In cases where explanation data may be included in the feedback, the explanation data may be used to determine compliance with conditions that may be compulsory for success and/or those that may guarantee failure. In some cases, explanation data may be used to determine SO compliance where a SO-confidence coefficient is not provided by the provisioned agent 134.

When the SCL 200 determines that the edge-zone device is SO-compliant (e.g., for at least one specific SO), the SCL 200 may cause, e.g., via the PAL 250, the edge-zone device to display an option for the specific SO (208). For example, when an edge-zone device is SO-compliant and a menu of secure-operations (SOs) is being viewed, the SCL 200 may cause the edge-zone device to display an option for the specific SO (and/or other SOs for which the edge-zone device is SO-compliant). Displaying the option may include displaying an interface button for selecting the SO, highlighting to indicate that the SO is available, or other interface element to indicate that the SO may be executed.

When the SCL 200 determines that the edge-zone device is not SO-compliant (e.g., for at least one specific SO), the SCL 200 may cause, e.g., via the PAL 250, the edge-zone device to suppress an option for the specific SO (210). For example, when an edge-zone device not is SO-compliant and a menu of secure-operations (SOs) is being viewed, the SCL 200 may cause the edge-zone device to omit an option for the specific SO (and/or other SOs for which the edge-zone device is not SO-compliant). Omitting the option may include hiding an interface button for selecting the SO, greying an interface element to indicate that the SO is available, or otherwise altering/hiding an interface element to indicate that the SO may not be executed.

When the interface option corresponding to the specific SO is selected (e.g., in scenarios where the edge-zone device is SO-compliant), the SCL 200 may cause execution of the specific SO (212). For example, the SCL 200 may cause an account to be created (e.g., a credit account, a currency account, or other account). For example, the SCL 200 may cause a transaction to be executed (e.g. a credit transfer, a currency transfer, an exchange, or other transaction). For example, the SCL 200 may allow an account access operation (e.g., when information or controls regarding an account an accessed from the edge-zone device). In some case, execution may include creation of an interactive display on the edge-zone device to support execution of the specific SO.

Figure 3:
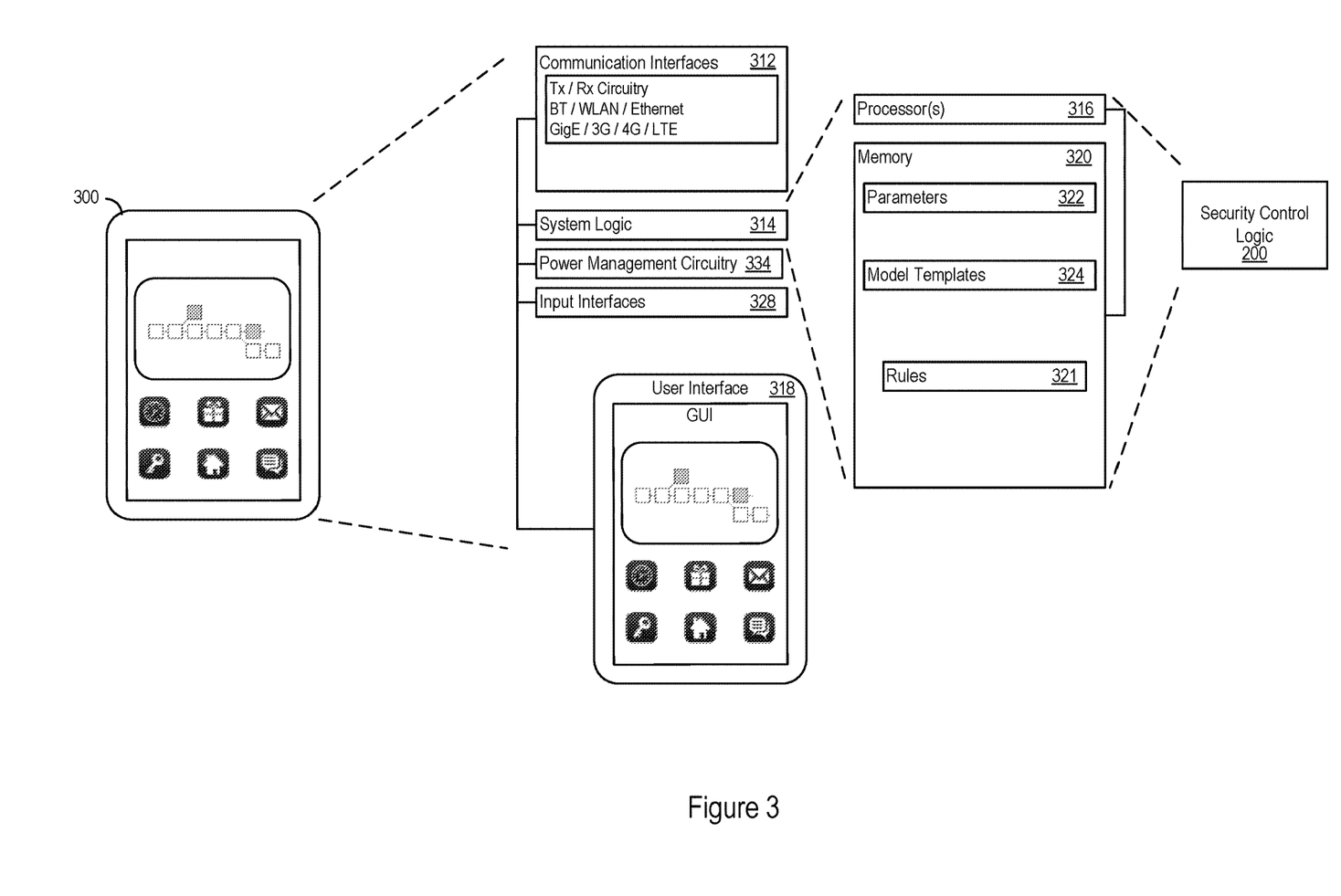
FIG. 3 shows an example security controller execution environment.

FIG. 3 shows an example security controller execution environment (SCEE) 300 which may be implemented as control prime circuitry. The SCEE 300 may include system logic 314 to support tasks described in the disclosure, such as agent control and communication. The system logic 314 may include processors 316, memory 320, and/or other circuitry, which may be used to implement SCL 200, which may provide software support to implement the various tasks performed by the SCL 200 (e.g., to transform the SCEE 300 (at least in part) into specialized security controller circuitry). In various implementations, the SCEE 300 may include a mobile device.

The memory 320 may be used to store parameters 322 and/or model templates 324 used in the agent control and communication. The memory 320 may further store rules 321 that may facilitate agent control and communication and/or the execution of other tasks.

The memory 320 may further include applications and structures, for example, coded objects, templates, or one or more other data structures to facilitate such as agent control and communication and/or the execution of other tasks. The SCEE 300 may also include one or more communication interfaces 312, which may support wireless, e.g. Bluetooth, Wi-Fi, WLAN, cellular (3G, 4G, LTE/A), and/or wired, ethernet, Gigabit ethernet, optical networking protocols. The communication interface 312 may support communication, e.g., through the communication layer as network interface circuitry, with data sources or resources used to facilitate, such as agent control and communication and/or the execution of other tasks. Additionally or alternatively, the communication interface 312 may support secure information exchanges, such as secure socket layer (SSL) or public-key encryption-based protocols for sending and receiving sanitized and/or un-sanitized data. The SCEE 300 may include power management circuitry 334 and one or more input interfaces 328.

The SCEE 300 may also include a user interface 318 that may include man-machine interfaces and/or graphical user interfaces (GUI). The GUI may be used to present interfaces and/or options to facilitate agent and/or frontend management and/or the execution of other tasks.

Figure 4:
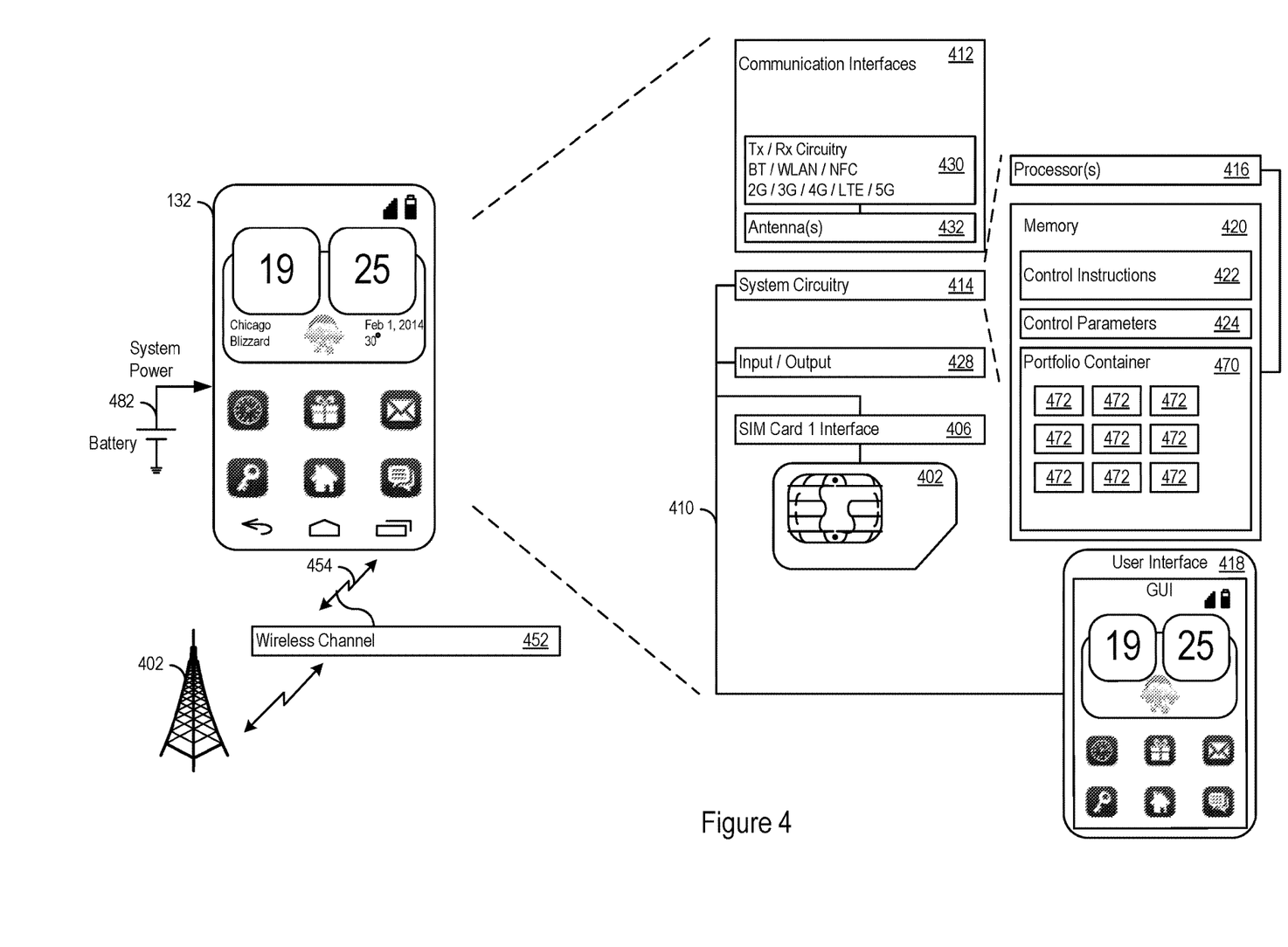
FIG. 4 shows an example edge-zone device.

FIG. 4 shows an example edge-zone device 132. The example edge-zone device 132 may communicate with a basestation 402 over a wireless channel 452. In this example, the example edge-zone device 132 supports one or more Subscriber Identity Modules (SIMs), such as the SIM1 402. Electrical and physical interface 406 connects SIM1 202 to the rest of the user equipment hardware, for example, through the system bus 410.

The example edge-zone device 132 includes communication interfaces 412, system logic 414, and a user interface 418. The system logic 414 may include circuitry and/or hardware, which may host combinations of software, firmware, or other executable code. The system logic 414 may be implemented, for example, with one or more systems on a chip (SoC), application specific integrated circuits (ASIC), discrete analog and digital circuits, and other circuitry. The system logic 414 is part of the implementation of any desired functionality in the example edge-zone device 132. In that regard, the system logic 414 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 418. The user interface 418 and the inputs 428 may include a graphical user interface, touch sensitive display, haptic feedback or other haptic output, voice or facial recognition inputs, buttons, switches, speakers and other user interface elements. Additional examples of the inputs 428 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 414 may include one or more processors 416 and memories 420. The memory 420 stores, for example, control instructions 422 that the processor 416 executes to carry out desired functionality for the example edge-zone device 132. The control parameters 424 provide and specify configuration and operating options for the control instructions 422. Further, the memory 420 may include a quarantined portfolio container 470, which may host various provisioned agents 472. The memory 420 may also store any BT, WiFi, 3G, 4G, 5G or other data that the edge-zone device 132 will send, or has received, through the communication interfaces 412.

In various implementations, the system power may be supplied by a power storage device, such as a battery 482.

In the communication interfaces 412, Radio Frequency (RF) transmit (Tx) and receive (Rx) circuitry 430 handles transmission and reception of signals through one or more antennas 432. The communication interface 412 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 412 may include transceivers that support transmission and reception under the 2G, 3G, BT, WiFi, Universal Mobile Telecommunications System (UMTS), High Speed Packet Access (HSPA)+, and 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations may use the techniques and architectures described above.

E1. In an example, a system includes: network interface circuitry configured to establish a sanitized uplink between a privacy-secure-edge-zone provisioned agent and a central-zone-provisioned security controller, the sanitized uplink configured to prevent upstream transport of un-sanitized data; and security control circuitry configured to execute controller-blind secure-operation (SO) control of an edge-zone device by: providing a SO confidence assignment matrix from the security controller to the provisioned agent, the SO confidence assignment matrix including multiple condition-descriptors configured to support a SO confidence analysis based on un-sanitized data, the security controller being blind to the un-sanitized data; responsive to: the provisioned agent accessing the un-sanitized data while localized in the privacy-secure edge-zone; and the provisioned agent determining, via the SO confidence analysis, based on the SO confidence assignment matrix and the un-sanitized data, a SO confidence coefficient for the edge-zone device: receiving the SO confidence coefficient from the provisioned agent while remaining blind to the un-sanitized data; based on the SO confidence coefficient, determining whether the edge-zone device is SO compliant; at a time when the edge-zone device is SO compliant, providing a SO interface option for a selected secure-operation; at a time when the edge-zone device is not SO compliant, suppressing the SO interface option for the selected secure-operation; and responsive to selection of the SO interface option via an input interface of the edge-zone device, causing execution of the selected secure-operation.

E2. The system of example E1, where: optionally, the selected secure-operation is configured to generate an interactive interface on a display of the edge-zone device; optionally, the privacy-secure edge-zone includes a logical edge-zone; optionally, the privacy-secure edge-zone includes a physical edge-zone; optionally, the SO confidence analysis is configured to be performed while the un-sanitized data is in a homomorphically-encrypted state; optionally, the un-sanitized data is translated into a mathematical representation prior to being placed in the homomorphically-encrypted state; optionally, the privacy-secure edge-zone is secured using homomorphic encryption; optionally, a secure enclave is defined within the privacy-secure edge-zone.

E3. The system of any of examples E1-E2, where the selected secure-operation includes an account access action, an account creation action, or both.

E4. The system of any of examples E1-E3, where the multiple condition-descriptors correspond to indications of compliance with enterprise policy constraints.

E5. The system of example E4 or any of examples E1-E3, where the enterprise policy constraints include terms for compliance with a regulatory framework.

E6. The system of any of examples E1-E5, where at least an individual one of the multiple-condition descriptors prevents execution of a parallel transaction on the edge-zone device, the parallel transaction, when executed, obfuscates a source of the parallel transaction.

E7. The system of any of examples E1-E6, where the multiple condition-descriptors include asserted private data held within the central-zone for comparison with captured private data from the edge-zone device.

E8. The system of example E7 or any of examples E1-E6, where the SO confidence assignment matrix is configured to compel a reduction in the determined SO confidence coefficient when a mismatch between the asserted private data and the captured private data is identified.

E9. The system of example E8 or any of examples E1-E7, where the multiple condition-descriptors further support collection of a captured context for the captured private data.

E10. The system of example E9 or any of examples E1-E8, where SO confidence assignment matrix is configured to increase the reduction that is compelled when the captured context includes a reliable context.

E11. In an example, a method includes: at network interface circuitry, establishing a sanitized uplink between a privacy-secure-edge-zone provisioned agent and a central-zone-provisioned security controller, the sanitized uplink configured to prevent upstream transport of un-sanitized data; and at security control circuitry, executing controller-blind secure-operation (SO) control of an edge-zone device by: providing a SO confidence assignment matrix from the security controller to the provisioned agent, the SO confidence assignment matrix including multiple condition-descriptors configured to support a SO confidence analysis based on un-sanitized data, the security controller being blind to the un-sanitized data; responsive to: the provisioned agent accessing the un-sanitized data while localized in the privacy-secure edge-zone; and the provisioned agent determining, via the SO confidence analysis, based on the SO confidence assignment matrix and the un-sanitized data, a SO confidence coefficient for the edge-zone device: receiving the SO confidence coefficient from the provisioned agent while remaining blind to the un-sanitized data; based on the SO confidence coefficient, determining whether the edge-zone device is SO compliant; at a time when the edge-zone device is SO compliant, providing a SO interface option for a selected secure-operation; at a time when the edge-zone device is not SO compliant, suppressing the SO interface option for the selected secure-operation; and responsive to selection of the SO interface option via an input interface of the edge-zone device, causing execution of the selected secure-operation.

E12. The method of example E11, where: optionally, the selected secure-operation generates an interactive interface on a display of the edge-zone device; optionally, the privacy-secure edge-zone includes a logical edge-zone; optionally, the privacy-secure edge-zone includes a physical edge-zone; optionally, the SO confidence analysis is configured to be performed while the un-sanitized data is in a homomorphically-encrypted state; optionally, the un-sanitized data is translated into a mathematical representation prior to being placed in the homomorphically-encrypted state; optionally, the privacy-secure edge-zone is secured using homomorphic encryption; optionally, a secure enclave is defined within the privacy-secure edge-zone.

E13. The method any of examples E11-E12, where the selected secure-operation includes an account access action, an account creation action, or both.

E14. The method any of examples E11-E13, where the multiple condition-descriptors correspond to indications of compliance with enterprise policy constraints.

E15. The method of example E14 or any of examples E11-E13, where the enterprise policy constraints include terms for compliance with a regulatory framework.

E16. The method any of examples E11-E15, where at least an individual one of the multiple condition-descriptors prevents execution of a parallel transaction on the edge-zone device, the parallel transaction, when executed, obfuscates a source of the parallel transaction.

E17. In an example, a product includes: machine-readable media other than a transitory signal; and instructions stored on the machine-readable media, the instructions configured to, when executed, cause a machine to: at network interface circuitry, establish a sanitized uplink between a privacy-secure-edge-zone provisioned agent and a central-zone-provisioned security controller, the sanitized uplink configured to prevent upstream transport of un-sanitized data; and at security control circuitry, execute controller-blind secure-operation (SO) control of an edge-zone device by: providing a SO confidence assignment matrix from the security controller to the provisioned agent, the SO confidence assignment matrix including multiple condition-descriptors configured to support a SO confidence analysis based on un-sanitized data, the security controller being blind to the un-sanitized data; responsive to: the provisioned agent accessing the un-sanitized data while localized in the privacy-secure edge-zone; and the provisioned agent determining, via the SO confidence analysis, based on the SO confidence assignment matrix and the un-sanitized data, a SO confidence coefficient for the edge-zone device: receiving the SO confidence coefficient from the provisioned agent while remaining blind to the un-sanitized data; based on the SO confidence coefficient, determining whether the edge-zone device is SO compliant; at a time when the edge-zone device is SO compliant, providing a SO interface option for a selected secure-operation; at a time when the edge-zone device is not SO compliant, suppressing the SO interface option for the selected secure-operation; and responsive to selection of the SO interface option via an input interface of the edge-zone device, causing execution of the selected secure-operation.

E18. The product of example E17, where: optionally, the multiple condition-descriptors include asserted private data held within the central-zone for comparison with captured private data from the edge-zone device; optionally, the privacy-secure edge-zone includes a logical edge-zone; optionally, the privacy-secure edge-zone includes a physical edge-zone; optionally, the SO confidence analysis is configured to be performed while the un-sanitized data is in a homomorphically-encrypted state; optionally, the un-sanitized data is translated into a mathematical representation prior to being placed in the homomorphically-encrypted state; optionally, the privacy-secure edge-zone is secured using homomorphic encryption; optionally, a secure enclave is defined within the privacy-secure edge-zone.

E19. The product of example E18 or E17, where the SO confidence assignment matrix is configured to compel a reduction in the determined SO confidence coefficient when a mismatch between the asserted private data and the captured private data is identified.

E20. The product of example E19 or any of examples E17-E18, where the multiple condition-descriptors further support collection of a captured context for the captured private data.

E21. In an example, a method includes the method performed by operating the system of any of examples E1-E10; or performing any of or any combination of the steps the system of any of examples E1-E10 is configured to perform.

E22. In an example, a product includes: machine-readable media; and instructions stored on the machine-readable media, the instructions configured to cause a machine to implement the method of example E22, where: optionally the machine-readable media is other than a transitory signal and/or non-transitory; and optionally, the instructions are executable.

Various implementations have been specifically described. However, many other implementations are also possible.

Headings and/or subheadings used herein are intended only to aid the reader with understanding described implementations.

What is claimed is:

1. A system including:
   network interface circuitry configured to establish a sanitized uplink between a privacy-secure-edge-zone provisioned agent and a central-zone-provisioned security controller, the sanitized uplink configured to prevent upstream transport of un-sanitized data; and
   security control circuitry configured to execute controller-blind secure-operation (SO) control of an edge-zone device by:
   receiving a request for a selected secure-operation from an edge-zone device;
   responsive to:

the provisioned agent accessing the un-sanitized data while localized in the privacy-secure edge-zone; and the provisioned agent determining, via a SO confidence analysis, based on a SO confidence assignment matrix and un-sanitized data, a SO confidence coefficient for the edge-zone device, the SO confidence assignment matrix including multiple condition-descriptors configured to support the SO confidence analysis based on the un-sanitized data, the security controller being blind to the un-sanitized data:

receiving the SO confidence coefficient from the provisioned agent while remaining blind to the un-sanitized data;

based on the SO confidence coefficient, determining whether the edge-zone device is SO compliant;

at a time when the edge-zone device is SO compliant, causing execution of the selected secure-operation responsive to the request;

at a time when the edge-zone device is not SO compliant, refusing execution of the selected secure-operation responsive to the request.

2. The system of claim 1, where the selected secure-operation is configured to generate an interactive interface on a display of the edge-zone device.

3. The system of claim 1, where the selected secure-operation includes an account access action, an account creation action, or both.

4. The system of claim 1, where the multiple condition-descriptors correspond to indications of compliance with enterprise policy constraints.

5. The system of claim 4, where the enterprise policy constraints include terms for compliance with a regulatory framework.

6. The system of claim 1, where at least an individual one of the multiple-condition descriptors prevents execution of a parallel transaction on the edge-zone device, the parallel transaction, when executed, obfuscates a source of the parallel transaction.

7. The system of claim 1, where the multiple condition-descriptors include asserted private data held within the central-zone for comparison with captured private data from the edge-zone device.

8. The system of claim 7, where the SO confidence assignment matrix is configured to compel a reduction in the determined SO confidence coefficient when a mismatch between the asserted private data and the captured private data is identified.

9. The system of claim 8, where the multiple condition-descriptors further support collection of a captured context for the captured private data.

10. The system of claim 9, where SO confidence assignment matrix is configured to increase the reduction that is compelled when the captured context includes a reliable context.

11. A method including:
at network interface circuitry, establishing a sanitized uplink between a privacy-secure- edge-zone provisioned agent and a central-zone-provisioned security controller, the sanitized uplink configured to prevent upstream transport of un-sanitized data; and
at security control circuitry, executing controller-blind secure-operation (SO) control of an edge-zone device by:
receiving a request for a selected secure-operation from an edge-zone device;
responsive to:
the provisioned agent accessing the un-sanitized data while localized in the privacy-secure edge-zone; and the provisioned agent determining, via a SO confidence analysis, based on a SO confidence assignment matrix and the un-sanitized data, a SO confidence coefficient for the edge-zone device, the SO confidence assignment matrix including multiple condition-descriptors configured to support the SO confidence analysis based on the un-sanitized data, the security controller being blind to the un-sanitized data:

receiving the SO confidence coefficient from the provisioned agent while remaining blind to the un-sanitized data;

based on the SO confidence coefficient, determining whether the edge-zone device is SO compliant;

at a time when the edge-zone device is SO compliant, causing execution of the selected secure-operation responsive to the request;

at a time when the edge-zone device is not SO compliant, refusing execution of the selected secure-operation responsive to the request.

12. The method of claim 11, where the selected secure-operation generates an interactive interface on a display of the edge-zone device.

13. The method of claim 11, where the selected secure-operation includes an account access action, an account creation action, or both.

14. The method of claim 11, where the multiple condition-descriptors correspond to indications of compliance with enterprise policy constraints.

15. The method of claim 14, where the enterprise policy constraints include terms for compliance with a regulatory framework.

16. The method of claim 11, where at least an individual one of the multiple condition-descriptors prevents execution of a parallel transaction on the edge-zone device, the parallel transaction, when executed, obfuscates a source of the parallel transaction.

17. A product including:
machine-readable media other than a transitory signal; and
instructions stored on the machine-readable media, the instructions configured to, when executed, cause a machine to:
at network interface circuitry, establish a sanitized uplink between a privacy-secure-edge-zone provisioned agent and a central-zone-provisioned security controller, the sanitized uplink configured to prevent upstream transport of un-sanitized data; and
at security control circuitry, execute controller-blind secure-operation (SO) control of an edge-zone device by:
receiving a request for a selected secure-operation from an edge-zone device;
responsive to:
the provisioned agent accessing the un-sanitized data while localized in the privacy-secure edge-zone; and the provisioned agent determining, via a SO confidence analysis, based on a SO confidence assignment matrix and the un-sanitized data, a SO confidence coefficient for the edge-zone device, the SO confidence assignment matrix including multiple condition-descriptors configured to support the SO confidence analysis based on the un-sanitized data, the security controller being blind to the un-sanitized data:
receiving the SO confidence coefficient from the provisioned agent while remaining blind to the un-sanitized data;
based on the SO confidence coefficient, determining whether the edge-zone device is SO compliant;
at a time when the edge-zone device is SO compliant, causing execution of the selected secure-operation responsive to the request;
at a time when the edge-zone device is not SO compliant, refusing execution of the selected secure-operation responsive to the request.

18. The product of claim 17, where the multiple condition-descriptors include asserted private data held within the central-zone for comparison with captured private data from the edge-zone device.

19. The product of claim 18, where the SO confidence assignment matrix is configured to compel a reduction in the determined SO confidence coefficient when a mismatch between the asserted private data and the captured private data is identified.

20. The product of claim 19, where the multiple condition-descriptors further support collection of a captured context for the captured private data.

* * * * *